Nov. 28, 1939.    A. M. CUNHA    2,181,419
HORN CONTROL FOR A MOTOR VEHICLE
Filed April 25, 1938
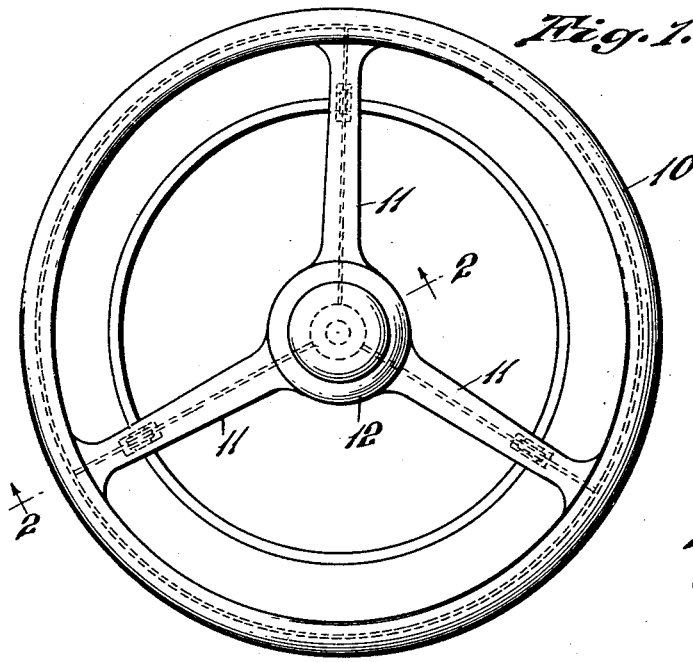
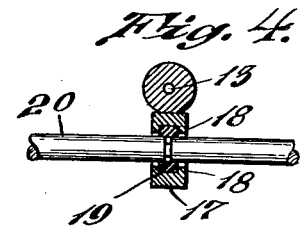
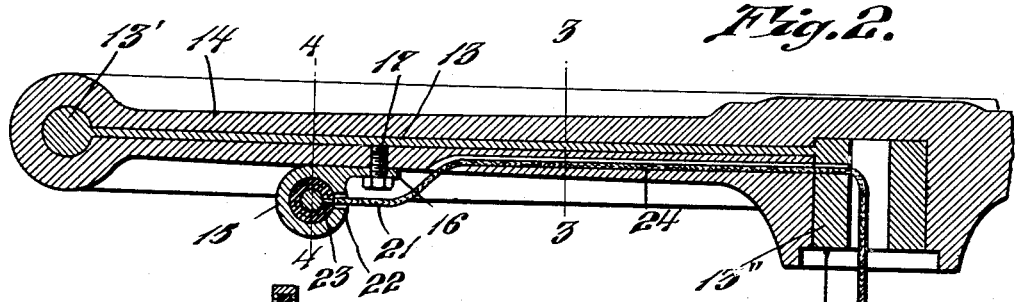
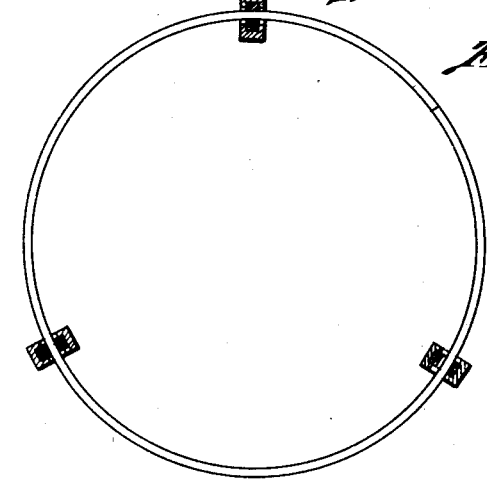
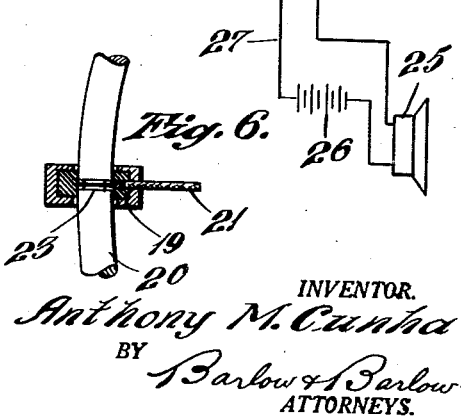
INVENTOR.
Anthony M. Cunha
BY
Barlow & Barlow
ATTORNEYS.

Patented Nov. 28, 1939

2,181,419

UNITED STATES PATENT OFFICE 2,181,419

HORN CONTROL FOR A MOTOR VEHICLE

Anthony M. Cunha, Providence, R. I., assignor of one-half to Adolph Jodoin, Marieville, R. I.

Application April 25, 1938, Serial No. 204,045

5 Claims. (Cl. 200—59)

This invention relates to a circuit closing device, more particularly adapted for use with the audible signal of a road motor vehicle; and has for one of its objects the provision of a device which may be within easy reach of the hand of the operator of the motor vehicle while the hand is in engagement with the gripping portion of the steering wheel so that the horn may be sounded without removing the hand from the steering wheel.

Another object of the invention is to provide a construction and arrangement of parts so that the usual horn button at the upper end of the steering column may be entirely dispensed with and this location utilized for mounting of other devices, desired to be in a location convenient to the driver.

Another object of the invention is the utilization of a soft compressible rubber for mounting the part which is to be engaged for operation of the audible signal so that this rubber may be easily compressed that a contact may be made and yet one of such a character as to provide a good insulation between the contacting portions and cause them to move one from the other by its inherent elasticity so that a very efficient and inexpensive mounting of the parts may be had.

Another object of the invention is to arrange the construction so that one of the leads from the contact member may be out of the way and inconspicuous.

With these and other objects in view, the invention consists of certain novel features of construction, as will be more fully described, and particularly pointed out in the appended claims.

In the accompanying drawing:

Fig. 1 is a top plan view of the steering wheel of a motor vehicle;

Fig. 2 is a sectional view on line 2—2 of Fig. 1;

Fig. 3 is a section on line 3—3 of Fig. 2;

Fig. 4 is a section on line 4—4 of Fig. 2;

Fig. 5 is a top plan view of the contact ring to be engaged for operating the circuit closure and a portion of its bracket mountings;

Fig. 6 is a view on a larger scale showing the manner of connecting the lead in to the hoop-like contact member.

At the present time horn control buttons are usually located at the upper end of the steering column. The diameter of the steering wheel which is gripped for guiding the motor vehicle is of such extent that the hand must be removed from the gripping portion of the wheel in order to operate the horn, and it is desirable in many instances that the hand remain in position on the wheel to guide the motor vehicle at the time that the horn is sounded, as frequently when the horn is sounded it is to attract the attention of some person because of the danger of some accident happening, and at such times it is increasingly desirable that the hands be in a position to properly guide the vehicle should any eventuality necessitate the same; and in order to carry out this thought I have provided a ring mounted just above or below and parallel to the periphery or gripping portion of the wheel and in such close proximity that by extending any or all of the four fingers of the hand and leaving the thumb in engagement with the wheel, the horn may be readily sounded, or various other means may be utilized for sounding, the horn, such for instance as by use of the knee of any means by which a movement in any direction is imparted to the ring supported beneath the wheel; and the following is a more detailed description of the present embodiment of this invention, illustrating the preferred means by which these advantageous results may be accomplished:

With reference to the drawing, 10 designates the annular gripping portion of a motor vehicle steering wheel which is provided with spokes 11 and hub 12 which fits onto the upper end of the steering column of the motor vehicle. Although the particular structure of this wheel is not vitally important, that here shown is of the type which has a steel core 13 with a moldable material 14, usually non-electrical conducting material, molded about the steel core 13 of the spokes and about the core 13' of the annular gripping portion 10. This steel core serves as a ground, being connected to the steel core 13'' of the hub which in turn is mounted upon the steel tube of the steering column. If, however, the wheel is made all of non-electrical conducting material, a second wire will be provided to carry the electrical connection of one side of the bracket, to be hereinafter described, to the steering column or some suitable ground, which is the connection to the other side of the source of energy, such as the battery.

A bracket 15 having an arm 16 is secured by bolt 17 to the wheel, the bolt 17 being in engagement with the steel core 13 of the wheel, as shown in Fig. 2, thus providing the metallic bracket 15 in connection with the ground or one side of the electrical source of energy, such as the battery. The bracket 15 comprises a body portion 17 and flanges 18 which serve to provide a retaining means for an annular ring 19 of soft rubber which is easily compressible. These brackets are three in number, one being provided on each of the spokes and they serve to support the contact hoop-like member 20 which is located in or passes through each of the annular rubber rings 19 and is supported by them out of contact with the flanges 18 of the body member of the bracket.

A lead wire 21 extends through an opening 22 in one bracket and passes through the rubber ring 19 to extend about a groove 23 and be soldered to the hoop-like contact member 20, this lead wire 22 being molded into one of the spokes 11 as at 24 and then extends into the hub of the wheel and down the steering column to the horn 25, the horn being in turn connected to a source of electrical energy 26 which may either be grounded or returned direct by lead 27 to the metallic portion of the wheel.

By having an annular flange such as 18 encircling the hoop-like contact member 20 at the three locations, such as shown in Fig. 1, it will be seen that a movement in substantially any direction will cause the soft compressible rubber rings 19 to be compressed and a contact made between the hoop-like contact member and the flanges, the hoop-like contact member being so close to the gripping portion of the wheel that the hand may operate it while in engagement with the wheel, thus providing an arrangement entirely independent of the horn button which is now used, which may be eliminated if desired to afford desirable space for other instruments.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A circuit closing device for controlling the audible signal of a road motor vehicle having a steering column and wheel comprising a member extending for a substantial distance within reach of the hands when the hands are in contact with the gripping portion of the steering wheel, a bracket secured to one of the spokes of said wheel and having a portion embracing said member, and compressible means of an insulating nature located between the inner embracing surface of said portion and the exterior surface of said member and supporting said member from and out of contact with said bracket whereby movement of said member to compress said means causes contact of said member and bracket that electric current may pass.

2. A circuit closing device for controlling the audible signal of a road motor vehicle having a steering column and wheel comprising an annular member having a groove therein and extending for a substantial distance within reach of the hands when the hands are in contact with the gripping portion of the steering wheel, a bracket provided with an aperture therein and secured to said wheel and embracing said annular member at said grooved portion, said bracket being electrically connected to one side of an energizing means, an electric conductor extending through said aperture and secured to said grooved portion for electrically connecting said member to the other side of said energizing means, and compressible means of an insulating nature located between said member and the surface of the bracket adjacent thereto and supporting said member from and out of contact with said bracket whereby movement of said member to compress said means causes contact of said member and bracket that electric current may pass.

3. A circuit closing device for controlling the audible signal of a road motor vehicle having a steering column and wheel having spokes, comprising a member extending for a substantial distance within reach of the hands when the hands are in contact with the gripping portion of the steering wheel, a bracket secured to one of said spokes and embracing said member, said bracket being electrically connected along one of said spokes to one side of an energizing means, and said member being electrically connected through one of said spokes to the other side of an energizing means, and compressible means of an insulating nature located between the inner embracing surface of said portion and the exterior surface of said member and supporting said member from and out of contact with said bracket whereby movement of said member to compress said means causes contact of said member and bracket that electric current may pass.

4. A circuit closing device for controlling the audible signal of a road motor vehicle having a steering column and wheel comprising a member extending for a substantial distance within reach of the hands when the hands are in contact with the gripping portion of the steering wheel, a bracket secured to said wheel and providing an annular channel embracing said member, said bracket being electrically connected to one side of an energizing means, and said member being electrically connected to the other side of an energizing means, and a ring of compressible rubber located in said channel and supporting said member from and out of contact with said bracket whereby movement of said member to compress said rubber causes contact of said member and bracket that electric current may pass.

5. A circuit closing device for controlling the audible signal of a road motor vehicle having a steering column and wheel having spokes, comprising a member extending for a substantial distance within reach of the hands when the hands are in contact with the gripping portion of the steering wheel, a bracket secured to one of said spokes and embracing said member, said bracket providing an annular channel being electrically connected along one of said spokes to one side of an energizing means, and said member being electrically connected through one of said spokes to the other side of an energizing means, and a ring of compressible rubber located in said channel and supporting said member from and out of contact with said bracket whereby movement of said member to compress said rubber causes contact of said member and bracket that electric current may pass.

ANTHONY M. CUNHA.